United States Patent
Nagata et al.

(10) Patent No.: US 12,226,962 B2
(45) Date of Patent: Feb. 18, 2025

(54) METHOD FOR MANUFACTURING FUEL CELL SEPARATOR

(71) Applicants: TOYOTA BOSHOKU KABUSHIKI KAISHA, Aichi-ken (JP); TAKAGI CHEMICALS, INC., Aichi-ken (JP)

(72) Inventors: Tatsuya Nagata, Nagoya (JP); Kazuyuki Hirata, Toyota (JP); Yuki Wakimoto, Nagoya (JP); Noriaki Takagi, Okazaki (JP); Masakuni Takagi, Okazaki (JP); Yuusuke Nagatani, Okazaki (JP); Daisuke Watanabe, Okazaki (JP); Kazuo Matsuyama, Okazaki (JP)

(73) Assignees: TOYOTA BOSHOKU KABUSHIKI KAISHA, Aichi-ken (JP); TAKAGI CHEMICALS, INC., Aichi-ken (JP)

( * ) Notice: Subject to any disclaimer, the term of this patent is extended or adjusted under 35 U.S.C. 154(b) by 231 days.

(21) Appl. No.: 17/752,160

(22) Filed: May 24, 2022

(65) Prior Publication Data

US 2022/0379569 A1    Dec. 1, 2022

(30) Foreign Application Priority Data

May 31, 2021 (JP) ................................. 2021-091382

(51) Int. Cl.
   *B29C 69/02* (2006.01)
   *H01M 8/0254* (2016.01)
   (Continued)

(52) U.S. Cl.
   CPC ........... *B29C 69/02* (2013.01); *H01M 8/0254* (2013.01); *B29K 2101/12* (2013.01); *B29K 2105/256* (2013.01); *B29L 2031/3468* (2013.01)

(58) Field of Classification Search
   CPC ... B29C 69/02; H01M 8/0254; B29K 2101/12
   See application file for complete search history.

(56) References Cited

U.S. PATENT DOCUMENTS 10,930,939 B2 *  2/2021  Nobata ............... H01M 8/0221
11,870,119 B2 *  1/2024  Hong ................ H01M 8/04731
(Continued)

FOREIGN PATENT DOCUMENTS

CN        1400679        3/2003
CN        1921208        2/2007
(Continued)

*Primary Examiner* — Nahida Sultana

(74) *Attorney, Agent, or Firm* — GREENBLUM & BERNSTEIN, P.L.C.

(57) ABSTRACT

A method for manufacturing a fuel cell separator includes heating a sheet, pressing the sheet using a first die, thereby forming the sheet so as to have a predetermined thickness, cooling, together with the first die, the sheet that has been formed so as to have the predetermined thickness, and pressing the sheet that has undergone the cooling using a second die, thereby forming a gas passage in the sheet. In the sheet, a content of a thermoplastic resin is greater than or equal to 20 weight percent and less than or equal to 30 weight percent and a content of the carbon material particles is greater than or equal to 70 weight percent and less than or equal to 80 weight percent. The heating the sheet includes heating the sheet to a temperature that is higher than a melting point of the thermoplastic resin.

13 Claims, 6 Drawing Sheets

(51) Int. Cl.
    *B29K 101/12*    (2006.01)
    *B29K 105/00*    (2006.01)
    *B29L 31/34*    (2006.01)

(56) References Cited

U.S. PATENT DOCUMENTS

| | | | |
|---|---|---|---|
| 2002/0127464 A1* | 9/2002 | Terazawa | B29C 48/05 |
| | | | 429/535 |
| 2003/0027030 A1 | 2/2003 | Kawashima et al. | |
| 2004/0195724 A1 | 10/2004 | Yoshida et al. | |
| 2013/0252136 A1* | 9/2013 | Suzuki | H01M 8/0206 |
| | | | 429/535 |
| 2016/0072135 A1* | 3/2016 | Okamoto | H01M 8/0297 |
| | | | 228/5.5 |
| 2017/0069926 A1* | 3/2017 | Jeong | H01M 8/0273 |
| 2018/0069248 A1* | 3/2018 | Suzuki | H01M 8/0223 |
| 2019/0044161 A1* | 2/2019 | Tanaka | H01M 8/0228 |
| 2019/0296384 A1* | 9/2019 | Inoue | H01M 8/2465 |
| 2020/0185753 A1* | 6/2020 | Kwon | H01M 10/0404 |
| 2023/0327173 A1* | 10/2023 | Wu | H05B 3/22 |
| | | | 432/8 |

FOREIGN PATENT DOCUMENTS

| | | | | |
|---|---|---|---|---|
| CN | 101071876 | | 11/2007 | |
| JP | 2002-198062 | | 7/2002 | |
| JP | 2007227363 A | * | 9/2007 | B32B 27/02 |

\* cited by examiner

METHOD FOR MANUFACTURING FUEL CELL SEPARATOR

BACKGROUND

1. Field

The present disclosure relates to a method for manufacturing a fuel cell separator.

2. Description of Related Art

Conventionally, polymer electrolyte fuel cells include stacked power generation cells. The power generation cells each include a power generation portion having a membrane electrode assembly and two separators that hold the power generation portion. The separators each include gas passages through which reactant gas flows.

Japanese Laid-Open Patent Publication No. 2002-198062 discloses a method for manufacturing a fuel cell separator that includes a mixture in which carbon powder and thermoplastic resins are mixed. In the manufacturing method, the mixture is extruded so as to form a sheet molding. Then, a roller with a groove shaped in correspondence with a gas passage is used to transfer the groove to the sheet molding. The separator including gas passages is thus manufactured.

In such a separator, when the thickness of the entire separator varies greatly, the contact area between the separator and the power generation portion may decrease so that the contact resistance therebetween increases. Accordingly, it is desired that the variations in the thickness of the separator be reduced in order to improve the performance of a fuel cell.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for manufacturing a fuel cell separator that solves the above-described problem is provided. The fuel cell separator is made of material that contains a thermoplastic resin and conductive carbon material particles. The fuel cell separator includes a gas passage through which reactant gas flows. The method includes heating a sheet made of material that contains a thermoplastic resin and conductive carbon material particles dispersed in the thermoplastic resin, pressing the sheet heated in the heating using a first die, thereby forming the sheet so as to have a predetermined thickness, cooling, together with the first die, the sheet that has been formed so as to have the predetermined thickness through the pressing using the first die, and pressing the sheet that has undergone the cooling using a second die, thereby forming the gas passage in the sheet. A content of the thermoplastic resin is greater than or equal to 20 weight percent and less than or equal to 30 weight percent and a content of the carbon material particles is greater than or equal to 70 weight percent and less than or equal to 80 weight percent in the sheet. The heating the sheet includes heating the sheet to a temperature that is higher than a melting point of the thermoplastic resin.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
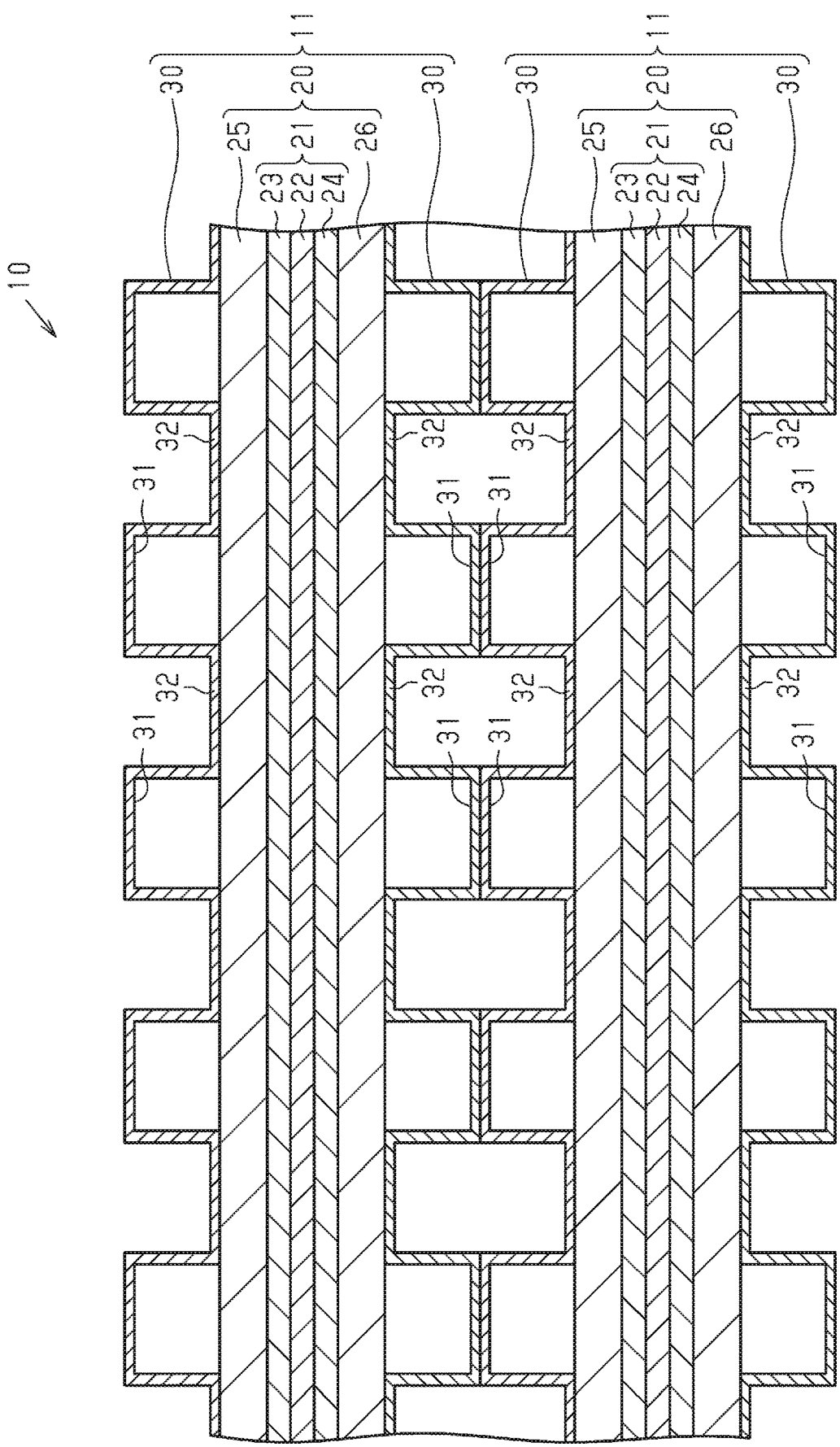
FIG. 1 is a cross-sectional view schematically showing the structure of a fuel cell provided with a fuel cell separator according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A method for manufacturing a fuel cell separator according to an embodiment will now be described with reference to FIGS. 1 to 10.

Some parts of the components in the drawings may be exaggerated or simplified. Further, the dimensional ratios of the components in the drawings may be different from actual ones.

Structure of Fuel Cell

First, a fuel cell provided with the fuel cell separator will now be described.

As shown in FIG. 1, the fuel cell includes a cell stack 10 having stacked power generation cells 11.

The power generation cells 11 each include a sheet-shaped membrane electrode gas diffusion layer assembly 20 and two separators 30 that hold the membrane electrode gas diffusion layer assembly 20 in the thickness direction.

The membrane electrode gas diffusion layer assembly 20 includes a membrane electrode assembly 21, an anode gas diffusion layer 25, and a cathode gas diffusion layer 26.

The membrane electrode assembly 21 includes an electrolyte layer 22, an anode electrode layer 23, and a cathode electrode layer 24. The electrolyte layer 22 is, for example, a solid polymer membrane. The anode electrode layer 23 and the cathode electrode layer 24 hold the electrolyte layer 22 in the thickness direction.

The anode gas diffusion layer 25 covers the surface of the anode electrode layer 23 opposite from the electrolyte layer 22. The cathode gas diffusion layer 26 covers the surface of the cathode electrode layer 24 opposite from the electrolyte layer 22. The anode gas diffusion layer 25 and the cathode gas diffusion layer 26 are made of, for example, carbon fibers.

Structures of Separators 30

One of the separators 30 in the power generation cell 11 is located on the surface of the anode gas diffusion layer 25 opposite from the anode electrode layer 23. The other separator 30 in the power generation cell 11 is located on the surface of the cathode gas diffusion layer 26 opposite from the cathode electrode layer 24.

The separators 30 have, for example, a rectangular shape. Each separator 30 is made of material that contains a thermoplastic resin and conductive carbon material particles. In the separator 30, the carbon material particles are dispersed in the entire thermoplastic resin in the thickness direction.

Figure 2:
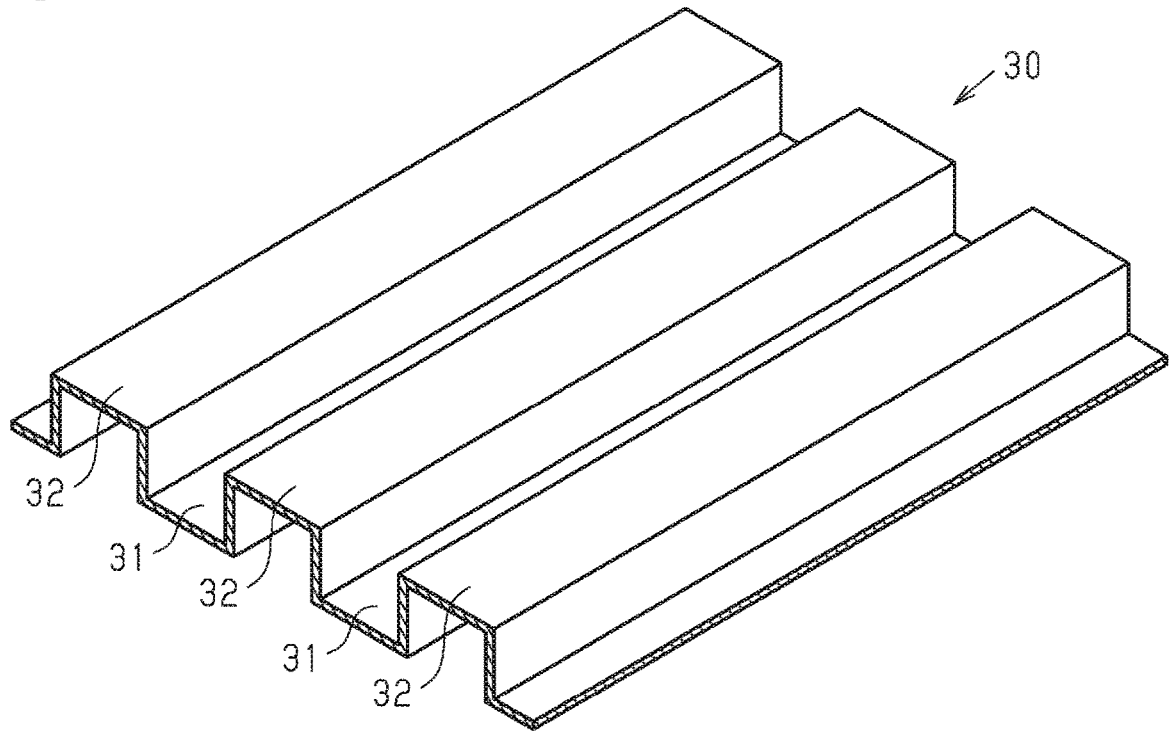
FIG. 2 is a perspective view showing the fuel cell separator.

As shown in FIG. 2, the separator 30 includes gas passages 31 and ribs 32. The gas passages 31 extend in parallel and are spaced apart from each other. The ribs 32 each extend along the gas passages 31 between adjacent ones of the gas passages 31. That is, the separator 30 includes the gas passages 31 and the ribs 32 that are alternately arranged in parallel.

Each gas passage 31 has the shape of a groove that opens toward the membrane electrode gas diffusion layer assembly 20. Hydrogen gas (reactant gas) flows through each gas passage 31 of one of the separators 30. Air (reactant gas) flows through each gas passage 31 of the other separator 30.

In the power generation cell 11, one of the separators 30 is arranged such that the top surface of each rib 32 is in contact with the anode gas diffusion layer 25. This allows the hydrogen gas flowing through each gas passage 31 to be supplied through the anode gas diffusion layer 25 to the anode electrode layer 23.

The other separator 30 is arranged such that the top surface of each rib 32 is in contact with the cathode gas diffusion layer 26. This allows the air flowing through each gas passage 31 to be supplied through the cathode gas diffusion layer 26 to the cathode electrode layer 24.

In the membrane electrode assembly 21, the hydrogen gas supplied to the anode electrode layer 23 electrochemically reacts with the air supplied to the cathode electrode layer 24 so as to generate power.

Method for Manufacturing Separators 30

The method for manufacturing each separator 30 will now be described.

Figure 3:
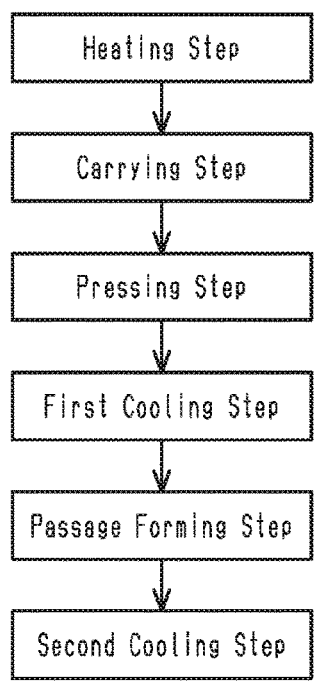
FIG. 3 is a flowchart sequentially illustrating the steps of the method for manufacturing the fuel cell separator.

As shown in FIG. 3, the method for manufacturing the separator 30 includes a heating step, a carrying step, a pressing step, a first cooling step, a passage forming step, and a second cooling step that are performed in this order.

As shown in FIGS. 4 to 10, the separator 30 is manufactured from a sheet 40. The sheet 40 is made of material that contains a thermoplastic resin and conductive carbon material particles dispersed in the thermoplastic resin.

In a case where the total weight of the sheet 40 is 100 weight percent, the sheet 40 contains, for example, 25 weight percent thermoplastic resin and 75 weight percent carbon material particles.

For example, one of polyphenylene sulfide (PPS), polyamide (PA), polytetrafluoroethylene (PTFE), polybutylene terephthalate (PBT), polyethylene terephthalate (PET), polypropylene (PP), polyethersulfone (PES), polyphenylene ether (PPE), and polycarbonate (PC) may be singly used as the thermoplastic resin. Alternatively, two or more of these materials may be used in combination as the thermoplastic resin. The thermoplastic resin of the present embodiment is polyamide. The melting point of polyamide is approximately 280° C.

For example, one of natural graphite, artificial graphite, and expanded graphite may be used as the carbon material particle. Alternatively, two or more of these materials may be used in combination as the carbon material particle. Examples of natural graphite include flake graphite, bulk graphite, and earthy graphite. The carbon material particle of the present embodiment is a flake graphite. The flake graphite has an average particle diameter of, for example, 40 μm.

Although not illustrated in the drawings, in the case of forming the sheet 40, a grinding machine, which grinds powders through a friction force or an impact force, is first used to grind particles of the thermoplastic resin and the carbon material particles so as to obtain a uniform powder composition. Further, a double belt pressing system including a pressurizing heating portion and a pressurizing cooling portion is used to heat and melt the obtained powder composition and then cool and solidify the powder composition. The sheet 40 is thus formed.

The steps in the method for manufacturing the separator 30 will now be described.

Heating Step

Figure 4:
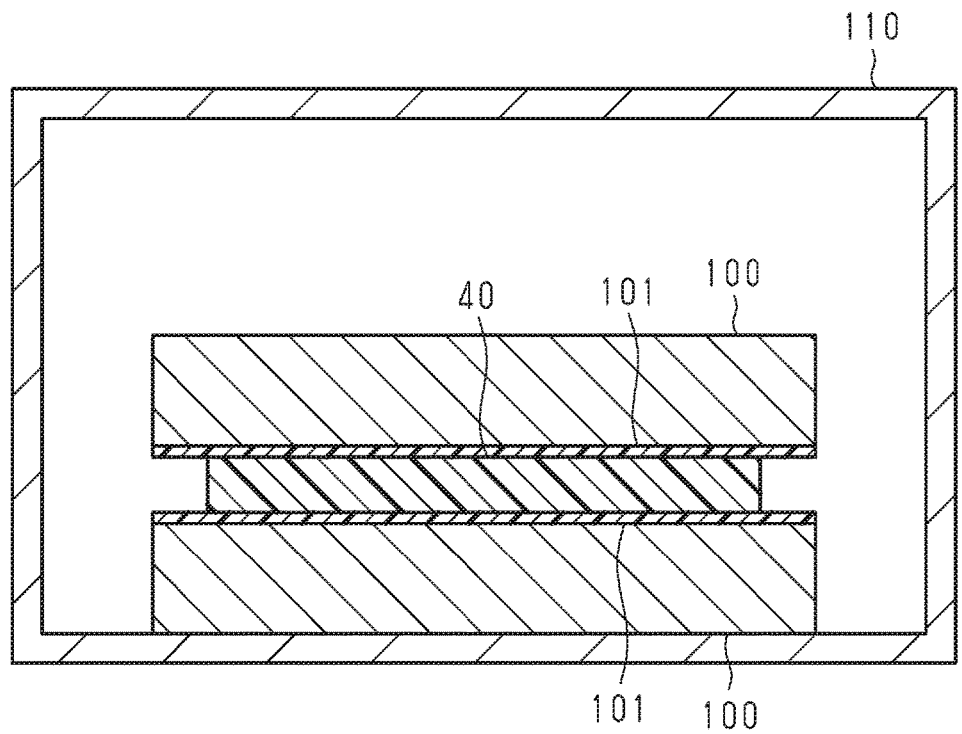
FIG. 4 is a cross-sectional view illustrating the heating step.

As shown in FIG. 4, in the heating step, the sheet 40 is first held between two metal plates 100 in the thickness direction. Then, the two metal plates 100 and the sheet 40, which are held between the two metal plates 100, are heated in a heating furnace 110. The heating of the sheet 40 by the heating furnace 110 facilitates uniform heating of the sheet 40.

In the heating step, the sheet 40 is heated to a temperature that is higher than the melting point of the thermoplastic resin. This melts the thermoplastic resin. In the present embodiment, the sheet 40 is heated to 300° C. to 350° C.

The metal plate 100 may be made of, for example, a metal material such as carbon steel having a relatively low thermal conductivity and a relatively low coefficient of thermal expansion.

The surface of each metal plate 100 facing the sheet 40 includes a die release layer 101, which has releasability. The die release layer 101 is, for example, a coating layer containing fluorine compounds.

Carrying Step

Figure 5:
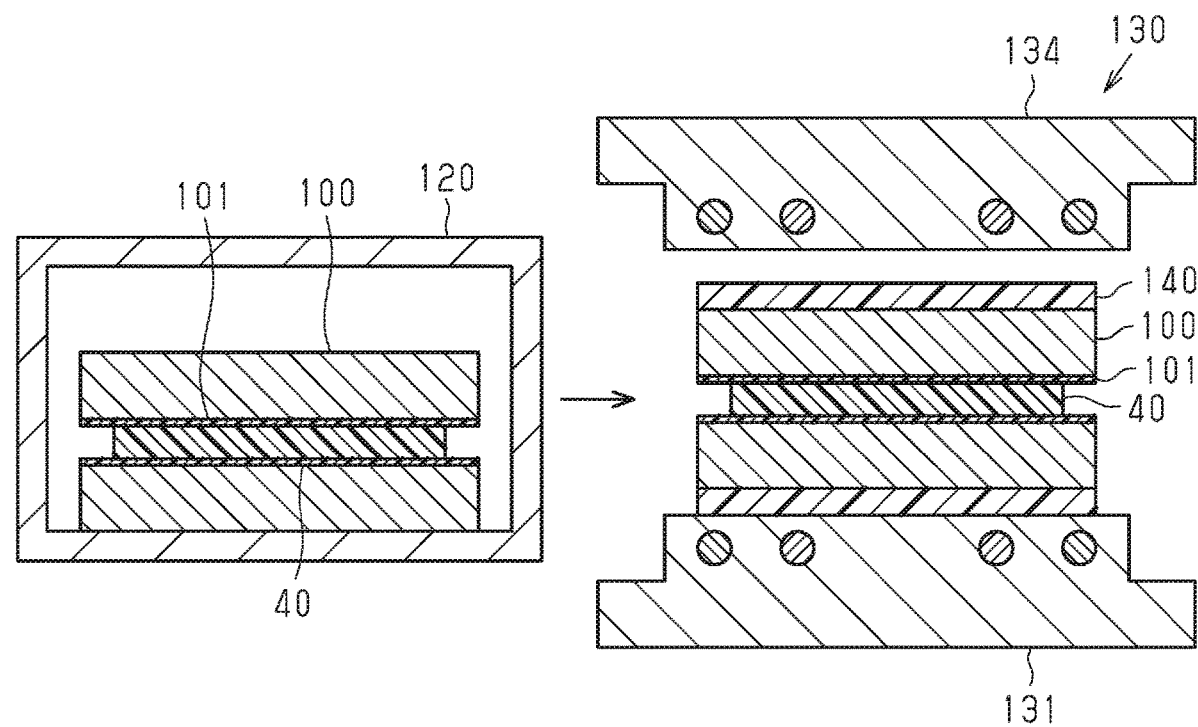
FIG. 5 is a cross-sectional view illustrating the carrying step.

As shown in FIG. 5, in the carrying step, the sheet 40 heated in the heating step is carried from the heating furnace 110 to a first die 130 with the sheet 40 accommodated in an insulating temperature-keeping container 120. While being carried, the sheet 40 is held between the two metal plates 100 and accommodated in the temperature-keeping container 120.

Pressing Step

Figure 6:
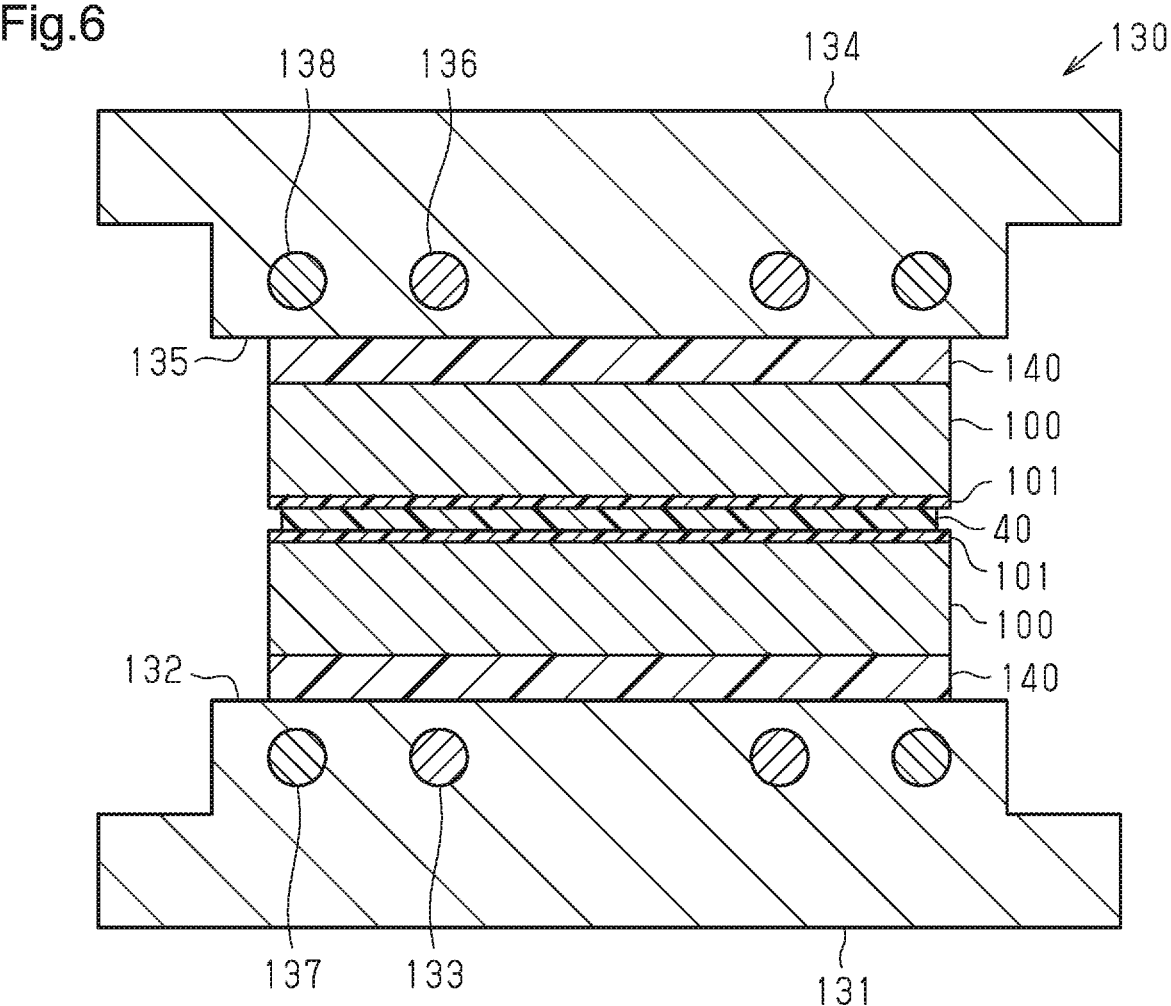
FIG. 6 is a cross-sectional view illustrating the pressing step.

As shown in FIG. 6, in the pressing step, the sheet 40 is pressed using the first die 130.

The structure of the first die 130 will now be described.

The first die 130 includes a fixed die 131 and a movable die 134 that is movable toward and away from the fixed die 131. The fixed die 131 and the movable die 134 respectively include opposing shaping surfaces 132, 135 on which the sheet 40 is shaped. The fixed die 131 includes a heater 133 that heats the fixed die 131. The movable die 134 includes a heater 136 that heats the movable die 134. The fixed die 131 includes a cooling passage 137 through which a refrigerant that cools the fixed die 131 flows. The movable die 134 includes a cooling passage 138 through which a refrigerant that cools the movable die 134 flows.

In the pressing step, an elastic member 140 is disposed between the fixed die 131 and one of the metal plates 100. Likewise, an elastic member 140 is disposed between the movable die 134 and the other metal plate 100. The elastic members 140 have a sheet shape that is elastically deformable. The elastic members 140 are made of, for example, material containing glass fiber and fluoro-rubber.

The first die 130 is heated by the heaters 133, 136 before the pressing step starts. That is, in the pressing step, the sheet 40 is pressed with the first die 130 heated. In the pressing step, it is preferred that the first die 130 be heated to, for example, 100° C. to 350° C. In the present embodiment, the first die 130 is heated to a temperature that is higher than approximately 280° C., which is the melting point of the thermoplastic resin; more specifically, heated to 330° C. to 350° C.

In the pressing step, the sheet 40 heated in the heating step and the two metal plates 100 are pressed by the first die 130 so that the sheet 40 has a predetermined thickness. In the present embodiment, the predetermined thickness refers to the thickness of the separator 30. In the pressing step, the sheet 40 is pressed with each elastic member 140 located between the corresponding metal plate 100 and the first die 130 and with each die release layer 101 located between the corresponding metal plate 100 and the sheet 40.

In the pressing step, the sheet 40 is formed so as to have the predetermined thickness and then cooled together with the first die 130. Such cooling is performed by passing a refrigerant through the cooling passages 137, 138 of the first die 130. The first die 130 is cooled with the first die 130 locked.

The cooling of the sheet 40 lowers the flowability of the thermoplastic resin. This allows the shape of the sheet 40 that has undergone the pressing step to be easily maintained. That is, the pressing step includes pressing the sheet 40 using the first die 130 and cooling the pressed sheet 40 until the thermoplastic resin is solidified to such an extent that the shape of the pressed sheet 40 is maintained.

First Cooling Step

Figure 7:
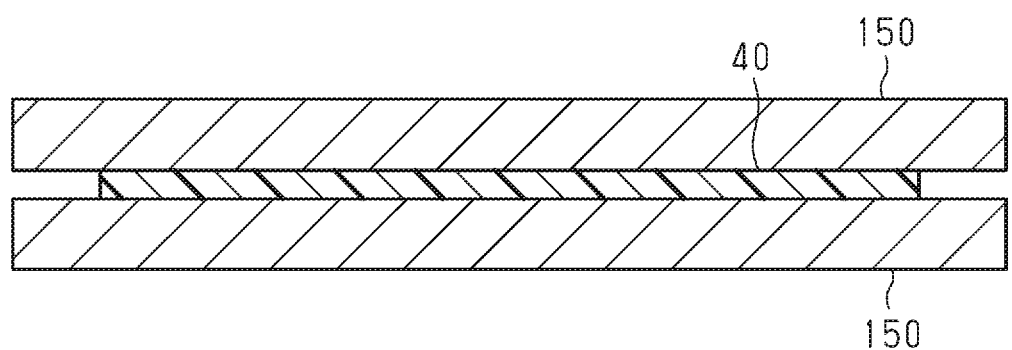
FIG. 7 is a cross-sectional view illustrating the first cooling step.

As shown in FIG. 7, in the first cooling step, the sheet 40 that has undergone the pressing step is cooled and solidified with the sheet 40 held between two first metal members 150 in the thickness direction.

In the first cooling step, the sheet 40 is air-cooled at room temperature with the sheet 40 held between the two first metal members 150. The sheet 40 is thus cooled to, for example, 100° C. or lower.

The first metal members 150 have, for example, a plate shape. It is preferred that the first metal members 150 be made of a metal material having a relatively high thermal conductivity and a relatively low coefficient of thermal expansion. The first metal members 150 may be made of, for example, copper or copper alloy.

Passage Forming Step

Figure 8:
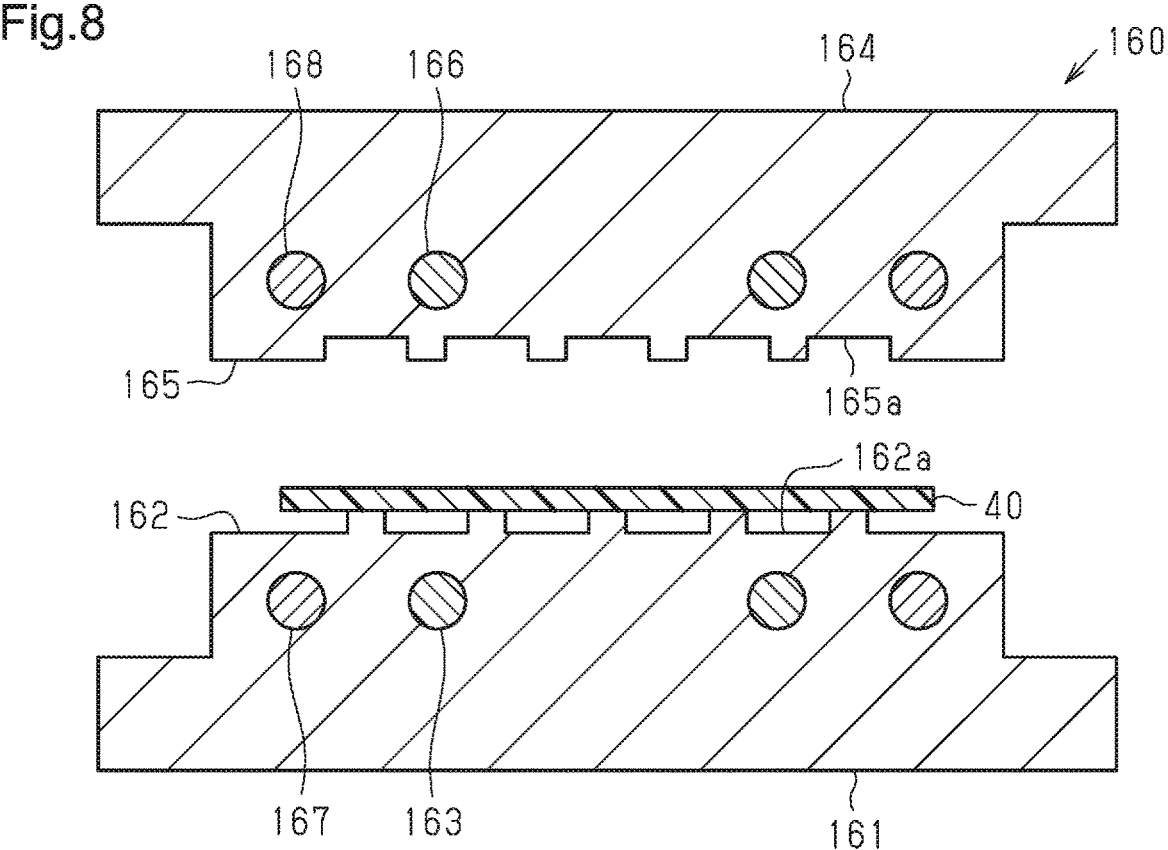
FIG. 8 is a cross-sectional view illustrating a state in which the second die has not been locked in the passage forming step.

As shown in FIG. 8, in the passage forming step, the sheet 40 is pressed using a second die 160.

The structure of the second die 160 will now be described.

The second die 160 includes a fixed die 161 and a movable die 164 that is movable toward and away from the fixed die 161. The fixed die 161 and the movable die 164 respectively include opposing shaping surfaces 162, 165 on which the sheet 40 is shaped. The shaping surface 162 includes grooves 162a. The shaping surface 165 includes grooves 165a. The grooves 162a, 165a are used to transfer the gas passages 31 and the ribs 32 to the sheet 40. The fixed die 161 includes a heater 163 that heats the fixed die 161. The movable die 164 includes a heater 166 that heats the movable die 164. The fixed die 161 includes a cooling passage 167 through which a refrigerant that cools the fixed die 161 flows. The movable die 164 includes a cooling passage 168 through which a refrigerant that cools the movable die 164 flows.

Figure 9:
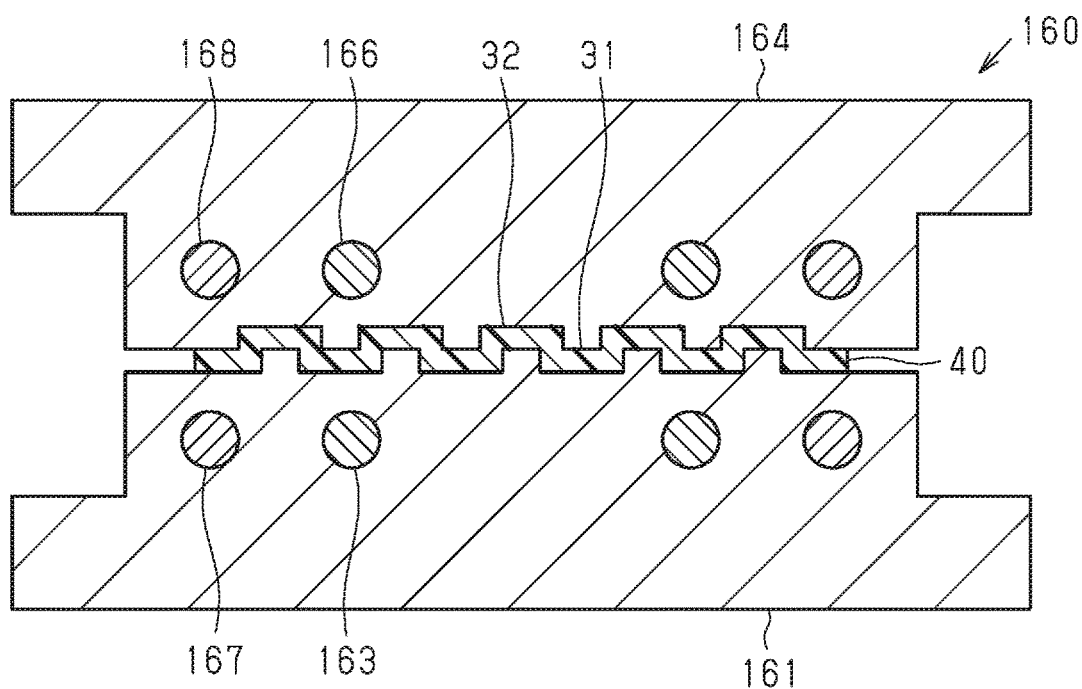
FIG. 9 is a cross-sectional view illustrating a state in which the second die has been locked in the passage forming step.

As shown in FIG. 9, in the passage forming step, the second die 160 is used to press the sheet 40 so that the gas passages 31 and the ribs 32 are formed in the sheet 40.

The second die 160 is heated by the heaters 163, 166 before the passage forming step starts. That is, in the passage forming step, the sheet 40 is pressed with the second die 160 heated. In the passage forming step, it is preferred that the second die 160 be heated to a temperature that is lower than the melting point of the thermoplastic resin; more specifically, heated to 50° C. to 160° C. In the present embodiment, the second die 160 is heated to around 90° C., which is a glass transition temperature of the thermoplastic resin.

Second Cooling Step

Figure 10:
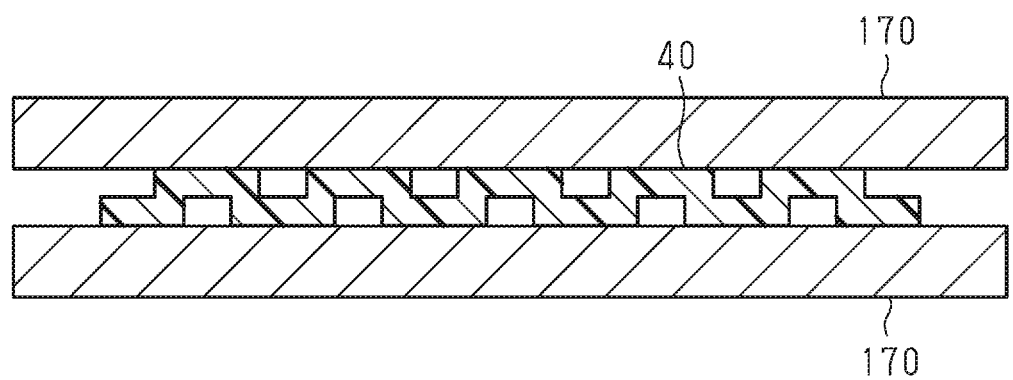
FIG. 10 is a cross-sectional view illustrating the second cooling step.

As shown in FIG. 10, in the second cooling step, the sheet 40 that has undergone the passage forming step is cooled and solidified with the sheet 40 held between two second metal members 170 in the thickness direction.

The second metal members 170 have, for example, a plate shape. It is preferred that the second metal members 170 be made of a metal material having a relatively high thermal conductivity and a relatively low coefficient of thermal expansion. The second metal members 170 may be made of, for example, copper or copper alloy.

In the second cooling step, the sheet 40 is air-cooled at room temperature with the sheet 40 held between the two second metal members 170. The sheet 40 is thus cooled to, for example, a temperature around room temperature.

Subsequent to the second cooling step, a punching step (not shown) is performed to punch the sheet 40 using the pressing device. The punching step includes, for example, a step that disposes a through-hole in the sheet 40 and a step that trims an outer circumferential portion of the sheet 40.

The operation and advantages of the present embodiment will now be described.

(1) The method for manufacturing the separator 30 includes the heating step, the pressing step, and the passage forming step. The heating step includes heating the sheet 40 to a temperature that is higher than the melting point of a thermoplastic resin. The sheet 40 is made of material that contains a thermoplastic resin and conductive carbon material particles dispersed in the thermoplastic resin. The pressing step includes pressing the sheet 40 heated in the heating step using the first die 130, thereby forming the sheet so as to have a predetermined thickness. The pressing step also includes cooling, together with the first die 130, the sheet 40 that has been formed so as to have the predetermined thickness through the pressing using the first die 130. The passage forming step includes pressing, using the second die 160, the sheet 40 pressed by the first die 130, thereby forming the gas passages 31 in the sheet 40. That is, the passage forming step includes pressing, using the second die 160, the sheet 40 that has been cooled in the pressing step, thereby forming the gas passages 31 in the sheet 40. In the sheet 40, the content of the thermoplastic resin is 25 weight percent and the content of the carbon material particles is 75 weight percent.

In such a method, the sheet 40, heated at a temperature higher than the melting point of the thermoplastic resin in the heating step, is formed so as to have the predetermined thickness and cooled in the pressing step. Then, the gas passages 31 are formed in the sheet 40 in the passage forming step.

In the sheet 40, the content of the thermoplastic resin is greater than or equal to 20 weight percent and less than or equal to 30 weight percent and the content of the carbon material particles is greater than or equal to 70 weight percent and less than or equal to 80 weight percent. As compared with heating such a sheet 40 to a temperature lower than the melting point, heating the sheet 40 to a temperature higher than the melting point of the thermoplastic resin increases the flowability of the thermoplastic resin and limits situations in which the sheet 40 loses its shape. This lowers the variations in thickness of the sheet 40 that has undergone the pressing step. In the passage forming step, the gas passages 31 are formed in the sheet 40 of which the thickness variation has been lowered. Accordingly, the variations in thickness of the entire separator 30 are reduced.

Further, an increase in the flowability of the thermoplastic resin in the heating step reduces the pressing load of the first die 130 in the pressing step.

Furthermore, heating the sheet 40 at a temperature higher than the melting point of the thermoplastic resin limits situations in which the thermoplastic resin is unevenly distributed in the separator 30. This limits the generation of cracks or pinholes in the separator 30.

(2) The heating step includes heating the sheet 40 in the heating furnace 110. The method for manufacturing the separator 30 includes the carrying step, which carries the sheet 40 from the heating furnace 110 to the first die 130, between the heating step and the pressing step.

When, for example, the first die 130 is heated to perform the heating step, the first die 130 needs to be heated to a temperature that is higher than the melting point of the thermoplastic resin. In this case, the pressing step needs a long period of time until cooling of the first die 130 that has been heated to a temperature higher than the melting point is completed.

In the above-described method, the sheet 40 is heated in an apparatus that is different from the first die 130 and then carried to the first die 130. This eliminates the need to heat the first die 130 to a temperature higher than the melting point. Thus, the sheet 40 is cooled in the pressing step for a shorter period of time. Accordingly, a decrease in the productivity of the separator 30 is limited.

(3) The carrying step includes carrying the sheet 40 with the sheet 40 accommodated in the temperature-keeping container 120.

Such a method limits situations in which the temperature of the sheet 40 decreases while the sheet 40 is carried from the heating furnace 110 to the first die 130. This limits a decrease in the flowability of the thermoplastic resin and thus reduces the pressing load of the first die 130 in the pressing step.

(4) The pressing step includes pressing the sheet 40 with the first die 130 heated.

Such a method limits situations in which the temperature of the sheet 40 decreases while the sheet 40 in the first die 130 is pressed in the pressing step. This limits a decrease in the flowability of the thermoplastic resin and thus reduces the pressing load of the first die 130 in the pressing step.

(5) The heating step includes heating the two metal plates 100 and the sheet 40 with the sheet 40 held between the two metal plates 100 in the thickness direction.

The pressing step includes pressing the sheet 40 between the two metal plates 100.

In such a method, the sheet 40 and the two metal plates 100 are heated in the heating step. Then, the sheet 40 is pressed between the two metal plates 100 in the pressing step. This limits situations in which the temperature of the sheet 40 decreases while the pressing step is performed. Accordingly, the pressing load of the first die 130 in the pressing step is reduced.

Additionally, in the above-described method, the sheet 40 is held between the two metal plates 100 in the heating step and the pressing step. This limits the deformation of the sheet 40 when thermally expanded in the heating step and the deformation of the sheet 40 when thermally contracted in the pressing step.

(6) The pressing step includes pressing the sheet 40 with each elastic member 140 located between the corresponding one of the two metal plates 100 and the first die 130.

In such a method, when the elastic members 140 are elastically deformed by the pressing load of the first die 130, the pressing load easily acts on the entire sheet 40 through the two metal plates 100 in a uniform manner. This further lowers the variations in thickness of the sheet 40 that has undergone the pressing step.

(7) The pressing step includes pressing the sheet 40 with each die release layer 101, which has releasability, located between the corresponding one of the two metal plates 100 and the sheet 40.

In such a method, after the pressing step, each die release layer 101 is located between the corresponding metal plate 100 and the sheet 40. This improves the releasability of the metal plate 100 from the sheet 40 and accordingly facilitates the manufacturing of the separator 30.

(8) The method for manufacturing the separator 30 includes the first cooling step between the pressing step and the passage forming step. In the first cooling step, the sheet 40 is cooled and solidified with the sheet 40 held between the two first metal members 150 in the thickness direction.

In such a method, heat is radiated from the sheet 40 through the two first metal members 150. Thus, the thermoplastic resin after the pressing step is quickly solidified. This allows the passage forming step to be quickly started and thus improves the productivity of the separator 30.

Further, in the above-described method, the sheet 40 is held between the two first metal members 150 in the first cooling step. This limits the deformation of the sheet 40 when thermally contracted.

(9) The passage forming step includes pressing the sheet 40 with the second die 160 heated to a temperature that is lower than the melting point of the thermoplastic resin.

Such a method maintains the dimension accuracy of the sheet 40 having the predetermined thickness, and softens the thermoplastic resin. Thus, the gas passages 31 are easily formed in the sheet 40 in the passage forming step.

(10) The method for manufacturing the separator 30 includes the second cooling step after the passage forming step. In the second cooling step, the sheet 40 is cooled and solidified with the sheet 40 held between the two second metal members 170 in the thickness direction.

In such a method, heat is radiated from the sheet 40 through the two second metal members 170. This quickly solidifies the thermoplastic resin after the passage formation and thus improves the productivity of the separator 30.

Further, in the above-described method, the sheet 40 is held between the two second metal members 170 in the second cooling step. This limits the deformation of the sheet 40 when thermally contracted.

(11) The method for manufacturing the separator 30 includes forming the sheet 40, using a double belt pressing system, by cooling and solidifying a uniform powder composition after heating and melting the powder composition. The powder composition is obtained using a grinding machine that grinds particles of the thermoplastic resin and the carbon material particles. The double belt pressing system includes a pressurizing heating portion and a pressurizing cooling portion.

In such a method, the carbon material particles are coupled to each other with a hybrid structure of the sheet 40 highly controlled. This forms the sheet 40 with a high thermal conductivity and a high coefficient of thermal expansion. The method for manufacturing the separator using such a sheet 40 maintains the hybrid structure, and reflects the thermal and electrical performance on the separator 30 without lowering the performance.

Modifications

The present embodiment may be modified as follows. The present embodiment and the following modifications can be combined as long as they remain technically consistent with each other.

The second metal members 170 may be made of a metal material other than copper or copper alloy.

The second cooling step may be omitted. In this case, the sheet 40 may be cooled and solidified by, for example, cooling the second die 160.

In the passage forming step, the sheet 40 may be pressed using the second die 160 without heating the second die 160.

The first metal members 150 may be made of a metal material other than copper or copper alloy.

The first cooling step may be omitted. In this case, the sheet 40 may be cooled and solidified by, for example, cooling the first die 130.

The die release layers 101 may be, for example, die release sheets each disposed separately from the corresponding metal plate 100 between the metal plate 100 and the sheet 40.

Each die release layer 101 may be omitted from the corresponding metal plate 100.

In the pressing step, the two elastic members 140 may be omitted.

In the heating step, the two metal plates 100 may be omitted and only the sheet 40 may be heated. In this case, the sheet 40 may be directly pressed using the first die 130 in the pressing step.

In the pressing step, the sheet 40 may be pressed using the first die 130 without heating the first die 130.

In the carrying step, the temperature-keeping container 120 may be omitted.

In the heating step, the sheet 40 may be heated by heating the first die 130 using the heaters 133, 136, instead of using the heating furnace 110. In this case, it is preferred that the sheet 40 be heated with the first die 130 locked.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a fuel cell separator made of material that contains a thermoplastic resin and conductive carbon material particles, the fuel cell separator including a gas passage through which reactant gas flows, the method comprising:
    heating a sheet made of material that contains a thermoplastic resin and conductive carbon material particles dispersed in the thermoplastic resin;
    pressing the sheet heated in the heating using a first die that includes a first fixed die and a first movable die that is movable toward and away from the first fixed die, thereby forming the sheet so as to have a predetermined thickness;
    cooling, together with the first die, the sheet that has been formed so as to have the predetermined thickness through the pressing using the first die; and
    pressing the sheet that has undergone the cooling using a second die that includes a second fixed die and a second movable die that is movable toward and away from the second fixed die, thereby forming the gas passage in the sheet, wherein
    a content of the thermoplastic resin is greater than or equal to 20 weight percent and less than or equal to 30 weight percent and a content of the carbon material particles is greater than or equal to 70 weight percent and less than or equal to 80 weight percent in the sheet, and
    the heating the sheet includes heating the sheet to a temperature that is higher than a melting point of the thermoplastic resin.

2. The method for manufacturing the fuel cell separator according to claim 1, wherein the heating the sheet includes heating the sheet in a heating furnace, and the method further comprises carrying the sheet from the heating furnace to the first die, between the heating the sheet and the pressing the sheet using the first die.

3. The method for manufacturing the fuel cell separator according to claim 2, wherein the carrying the sheet includes carrying the sheet with the sheet accommodated in a temperature-keeping container.

4. The method for manufacturing the fuel cell separator according to claim 1, wherein the pressing the sheet using the first die includes pressing the sheet with the first die heated.

5. The method for manufacturing the fuel cell separator according to claim 1, wherein the heating the sheet includes heating two metal plates and the sheet with the sheet held between the two metal plates in a thickness direction, and the pressing the sheet using the first die includes pressing the sheet between the two metal plates.

6. The method for manufacturing the fuel cell separator according to claim 5, wherein the pressing the sheet using the first die includes pressing the sheet with an elastic member located between the first die and each of the two metal plates.

7. The method for manufacturing the fuel cell separator according to claim 5, wherein the pressing the sheet using the first die includes pressing the sheet with a die release layer located between the sheet and each of the two metal plates, the die release layer having releasability.

8. The method for manufacturing the fuel cell separator according to claim 1, further comprising cooling and solidifying the sheet with the sheet held between two metal members in a thickness direction, between the cooling the sheet together with the first die and the pressing the sheet using the second die.

9. The method for manufacturing the fuel cell separator according to claim 1, wherein the pressing the sheet using the second die includes pressing the sheet with the second die heated to a temperature that is lower than the melting point of the thermoplastic resin.

10. The method for manufacturing the fuel cell separator according to claim 1, further comprising cooling and solidifying the sheet with the sheet held between two metal members in a thickness direction after the pressing the sheet using the second die.

11. A method for manufacturing a fuel cell separator made of material that contains a thermoplastic resin and conductive carbon material particles, the fuel cell separator including a gas passage through which reactant gas flows, the method comprising:

forming a sheet made of material that contains a thermoplastic resin and conductive carbon material particles dispersed in the thermoplastic resin, using a double belt pressing system, by cooling and solidifying a uniform powder composition after heating and melting the powder composition, the powder composition being obtained using a grinding machine that grinds particles of the thermoplastic resin and the carbon material particles, the double belt pressing system including a pressurizing heating portion and a pressurizing cooling portion;

heating the formed sheet made of material that contains the thermoplastic resin and conductive carbon material particles dispersed in the thermoplastic resin;

pressing the sheet heated in the heating using a first die, thereby forming the sheet so as to have a predetermined thickness;

cooling, together with the first die, the sheet that has been formed so as to have the predetermined thickness through the pressing using the first die; and pressing the sheet that has undergone the cooling using a second die, thereby forming the gas passage in the sheet, wherein a content of the thermoplastic resin is greater than or equal to 20 weight percent and less than or equal to 30 weight percent and a content of the carbon material particles is greater than or equal to 70 weight percent and less than or equal to 80 weight percent in the sheet, and the heating the sheet includes heating the sheet to a temperature that is higher than a melting point of the thermoplastic resin.

12. The method for manufacturing the fuel cell separator according to claim 1, wherein the first movable die is movable upward and downward relative to the first fixed die for pressing the heated sheet, and the second movable die is movable upward and downward relative to the second fixed die for pressing the cooled sheet.

13. The method for manufacturing the fuel cell separator according to claim 1, wherein the first fixed die and the first movable die include cooling passages through which refrigerant flows to perform the cooling of the sheet.

* * * * *